UNITED STATES PATENT OFFICE.

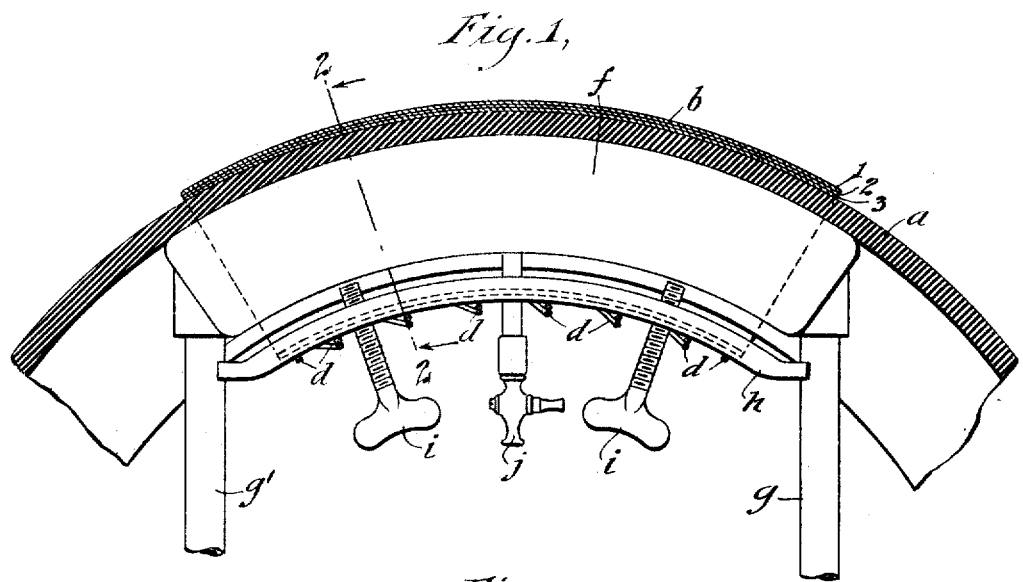
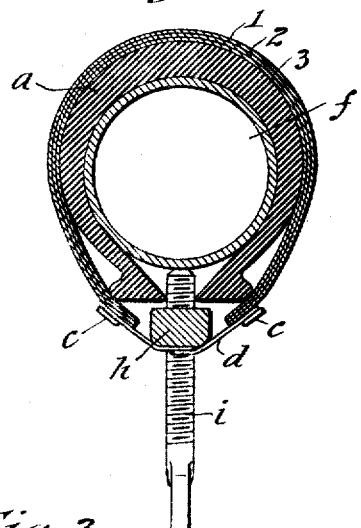
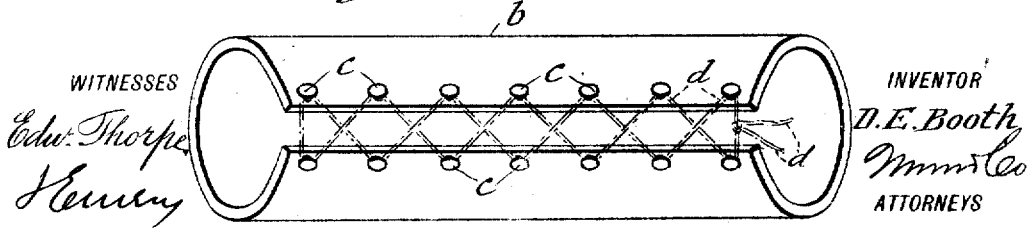

DANA E. BOOTH, OF TULSA, OKLAHOMA.

PRESSURE DEVICE FOR VULCANIZING RUBBER VEHICLE-TIRES.

1,294,865.   Specification of Letters Patent.   Patented Feb. 18, 1919.

Application filed August 12, 1918. Serial No. 249,452.

*To all whom it may concern:*

Be it known that I, DANA E. BOOTH, a citizen of the United States, and a resident of Tulsa, in the county of Tulsa and State of Oklahoma, have invented a new and Improved Pressure Device for Vulcanizing Rubber Vehicle-Tires, of which the following is a full, clear, and exact description, reference being had to the accompanying drawings, forming a part of the same.

This invention particularly relates to pressure devices for vulcanizing rubber vehicle tires wherein the heat for vulcanizing is supplied by a vulcanizer located within the tire.

The object of this invention is produce a flexible easily detachable pressure device capable of adaptability to all sizes or diameters of tires and one in which the tire may be placed and vulcanized without leaving marks or ridges upon the surface of the tire when the same is removed.

Heretofore when the vulcanizing means was located within the casing of the tire a vulcanizer which conformed to the inner curvation of the casing was placed therein and a tension bar provided with tension screws was arranged to bear against such vulcanizer. To hold the casing, the tension bar and the vulcanizer together a tape was wound tightly around the casing and the tension bar and the tension screws were then adjusted to produce the requisite pressure of the winding tape upon the tire. It is obvious that this method of attaching the tire to the vulcanizer required considerable time and adjustment to place the casing in operative position for vulcanization and also required considerable time to remove the tape wrapping when the process of vulcanization was completed. Furthermore, when the vulcanization of the casing was completed under tape pressure the surface of the tire would bear a reproduction of the surface of the tape and each lap of the tape would be clearly visible; if the tape be too loose a ridge would appear and if too tight, a depression.

My device can be applied and adjusted and removed in much shorter time than the devices now in use, and when my device is removed the surface of the tire is smooth.

My invention comprises a body portion tubular in form and shaped to conform to the contour of a pneumatic vehicle tire or shoe. The tubular body is split on its under side for adjustment so that it will fit any size or diameter of tire and produce uniform pressure upon the surface to be vulcanized.

Figure 1 represents a longitudinal section of my device in position;

Fig. 2 represents a cross section of the same on the lines 2—2 of Fig. 1; and

Fig. 3 represents a full view of my device.

Referring to the drawings my device comprises specifically a split tubular body $b$ of non-elastic material having a smooth inner surface shaped to conform to the contour of a pneumatic vehicle tire or shoe and of such length as to correspond to the bearing surface of the usual vulcanizer, as particularly illustrated in Fig. 1 which shows my pressure device in position relatively to the tire or shoe $a$ and the vulcanizer.

My device is adapted to be used in connection with an interior vulcanizer of accepted form, the best form being shown in the drawing in Fig. 1, wherein the device comprises a heating chamber $f$, a steam inlet $g$ and outlet $g^x$, a tension bar $h$, set screws $i$, and blow-off tap $j$.

My pressure device is adapted to embrace the tire to be vulcanized at those points where the vulcanizing means is located, and is designed to force the tire in tight contact with the said vulcanizing means. This is accomplished by adjustable means such as the buttons $c$ and lacings $d$ located on the pressure device, the lacings being designed to pass over the tension bar $h$ of the vulcanizer. As soon as the pressure device is laced in position the tension nuts $i$—$i$ may be moved so as to thoroughly compress the tire against the vulcanizing means and thus it forms a pressure device or mold embracing the tire to be vulcanized.

Owing to the split in the tubular body such body is capable of considerable lateral expansion so that the jaws formed on the two sides of the slit can be extended to embrace any diameter of tire and can be forced to conform to curvature of the tire by means of the lacing closing the slit.

When heat is applied to the interior of the tire and the process of vulcanization proceeds the outer surface of the tire is in contact with a smooth surface of the pressure device $b$, so that when the operation of vulcanization is completed the outer surface of the tire is smooth and regular and is a vast improvement on the appearance of the surface of the tire when the usual method of wrapping tape around the tire and the tension bar is used.

I have found it convenient to construct the body of my pressure device in laminated form wherein the outer layer 1 is composed of a non-elastic material or of overlapping metal strip, a layer 2 of a heat resisting material such as asbestos, and a layer 3 of paper or easily compressible material as this construction is capable of maintaining its form and at the same time is flexible enough to conform to the size or diameter of any tire.

What I claim is:

A pressure device for vulcanizing rubber pneumatic tires comprising a split tubular body of laminated construction adapted to embrace a vehicle tire, tie means for said body adapted to embrace a vulcanizer element and place the device under tension.

DANA E. BOOTH.